April 1, 1941.    J. E. SHERLOCK    2,237,199
THERMOSTAT FOR OVEN CONTROL
Filed Dec. 15, 1939    2 Sheets-Sheet 2
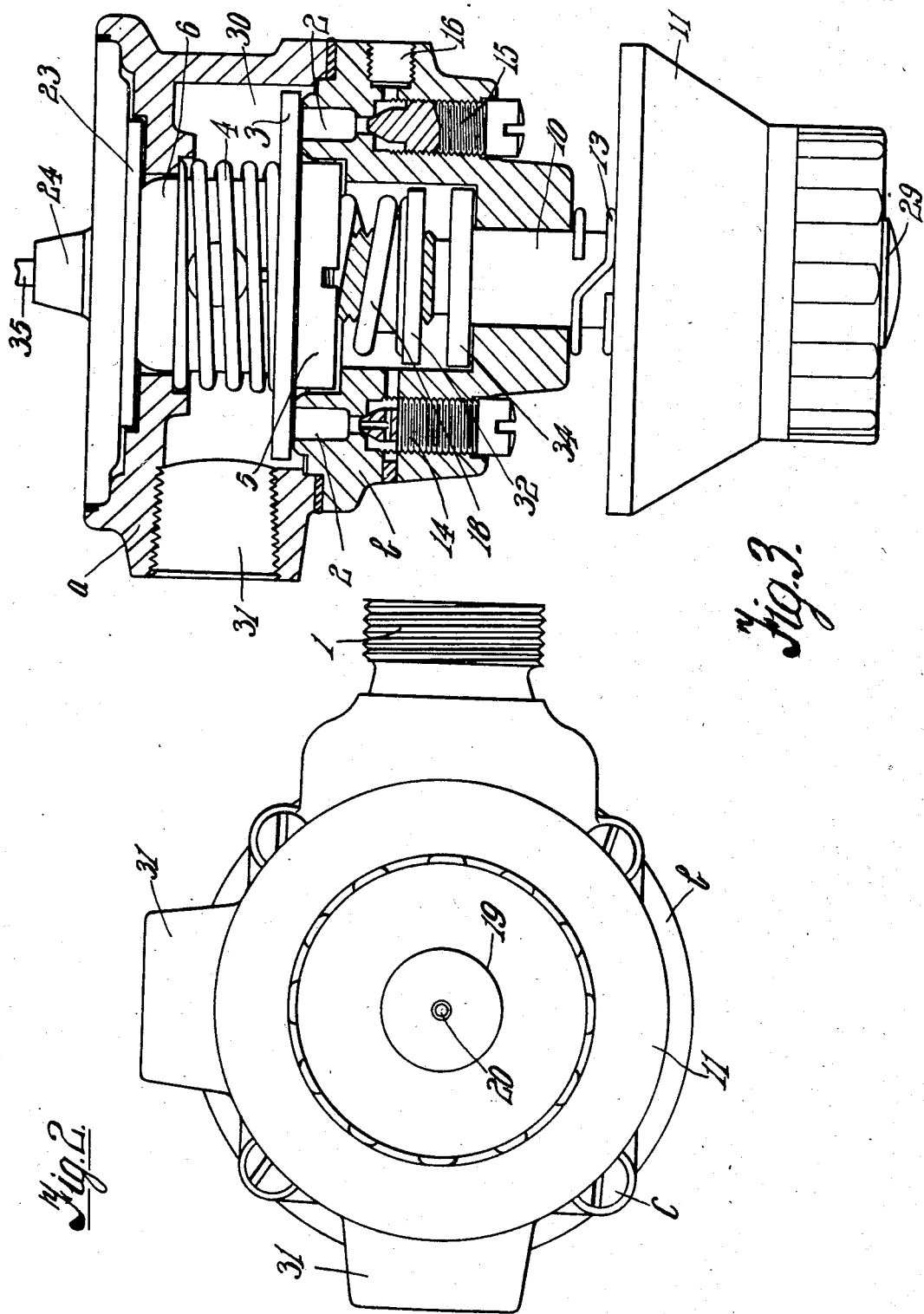
INVENTOR
JOHN EDWARD SHERLOCK
By Norris & Bateman
ATTORNEYS Patented Apr. 1, 1941

2,237,199

UNITED STATES PATENT OFFICE 2,237,199

THERMOSTAT FOR OVEN CONTROL

John Edward Sherlock, Sunbury-on-Thames, England

Application December 15, 1939, Serial No. 309,479
In Great Britain December 15, 1938

11 Claims. (Cl. 236—94)

This invention relates to thermostatic devices for controlling the temperature of gas or other ovens and to the type wherein the gas control valve is operated by means of a diaphragm or the like responsive to the variations in pressure of a fluid contained within a phial disposed within an oven.

The object of the present invention is to provide an improved construction or arrangement of the kind above indicated which also has means for giving a visible indication when the temperature within an oven reaches or exceeds a predetermined level.

According to the invention a thermostatic temperature control device of the kind described is provided wherein a diaphragm or the like sensitive to changes of fluid pressure caused by temperature variations within an oven is adapted to operate a gas inlet valve and to cause release of a magnetic device when a predetermined temperature level is reached or exceeded to enable an indicating device to be projected into a visible position.

According to the preferred form of the invention the improved thermostatic temperature control valve comprises a diaphragm responsive to changes of fluid pressure caused by temperature variations within an oven, a gas inlet valve controlled by movements of said diaphragm, a push rod operated by said diaphragm, a rotary spindle for varying the pressure at which said valve is operated, an operating knob carried by said spindle, a coloured indicating device normally held retracted within said knob by magnetic attraction and a spring for ejecting said indicating device to a visible position when the magnetic attraction is broken by movement of the push rod due to the diaphragm reaching the position of maximum temperature.

Reference will now be made to the accompanying drawings which illustrate by way of example a construction according to the invention and in which:

Fig. 2 is a front elevation of the valve shown in Fig. 1 and

Fig. 3 is a sectional plan taken at right angles to Fig. 1 and with the casing only in section.

Figure 1:
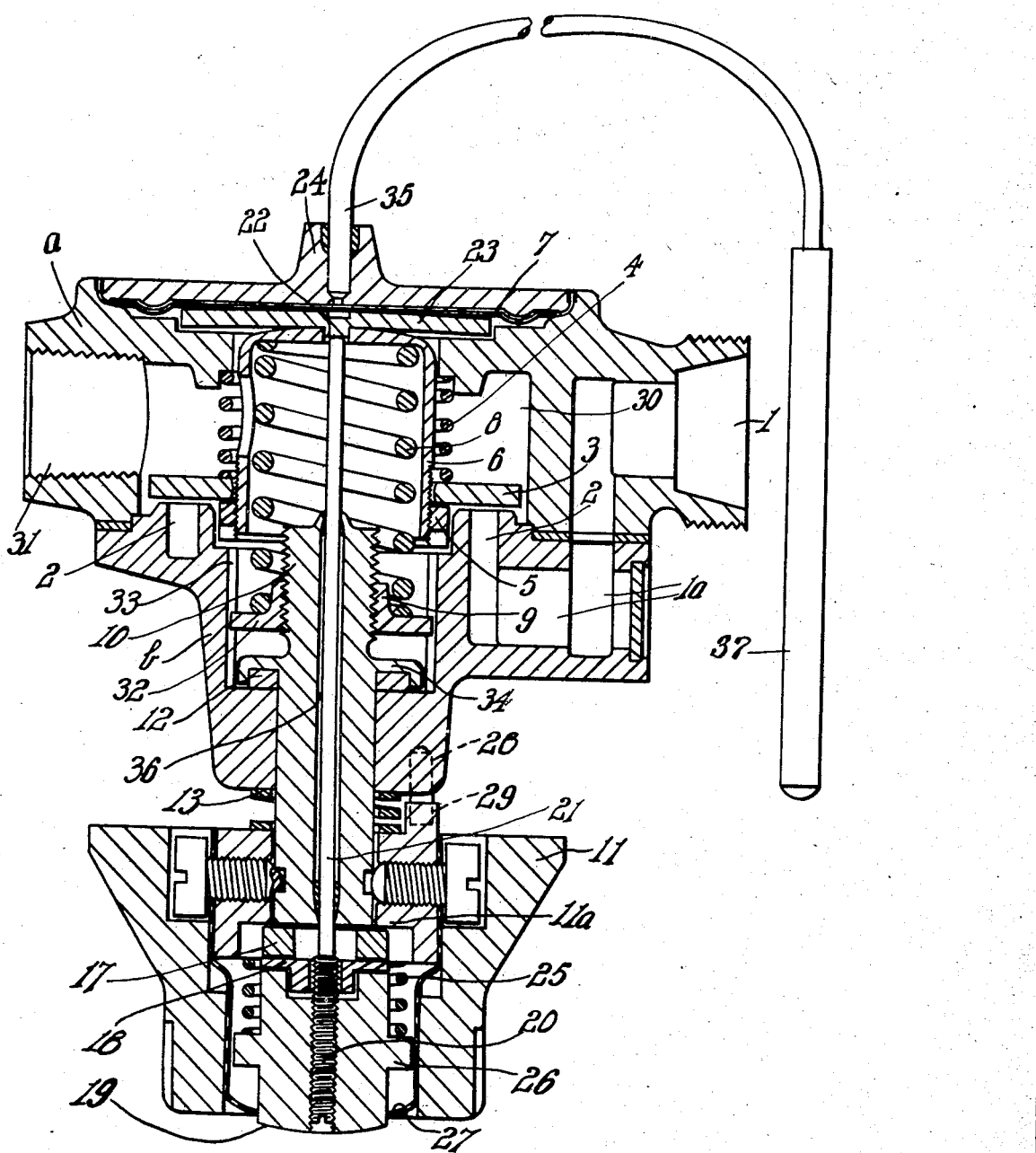
Fig. 1 is a sectional plan of a gas oven control valve.

In the construction illustrated the valve comprises a casing formed in two parts $a$ and $b$ detachably connected by screws $c$, the upper part being formed with a gas inlet passage 1 communicating through passages 1a with an annular recess 2 from which the flow of gas is controlled by an annular valve member 3 mounted in a chamber 30 communicating directly with gas outlet passages 31 either or both of which can be used according to requirements. The valve member 3 is urged on to its seating, constituted by the upper edges of the annular recess 2, by a spring 4 whose upper end bears against the inner end wall of the casing $a$. The valve member 3 is adapted to be lifted from its seating by engagement with the said valve member of a ring 5 screw threaded on to a thimble 6 pressed by a spring 8 towards a diaphragm 7.

Initial adjustment of the position of the annular valve member 3 relatively to its seating at any specified temperature, is made by adjustment of the screw threaded ring 5 along the thimble 6. The tension of the spring 8 is controlled by the position of a nut 9 adjustably mounted on the inner screw threaded portion of a spindle 10 whose outer end carries and is adapted to be rotated by an operating knob 11. When the spindle 10 is rotated relative axial movement of the nut 9 is compelled by arms 32 on the nut which engage grooves 33 cut in the adjacent wall of the casing part $b$. Leakage of gas along the spindle 10 is prevented by forming the said spindle with a flange 34 bearing upon a packing washer 12 supported by the outer portion of the casing part $b$ and close engagement being compelled by means of a spring 13.

The casing part $b$ also carries by-pass and pilot connections 14 and 15 respectively, the two valve members being screw threaded into their sockets and formed with grooved heads as shown in Fig. 3 for permitting rapid external adjustment. The by-pass connection 14 short circuits the annular valve 3, while the pilot connection 15 permits a flow of gas to take place through a pipe connected to the socket 16 for the purpose of lighting the stove irrespective of the position of the thermostatic valve.

The knob 11 is hollow and within it is mounted a magnet 17 secured to an inner surface 11a forming part of the knob. An iron armature 18 is secured to a cylindrical button 19 disposed concentrically within the knob, the said button being tapped centrally to receive a screw threaded stem 20 whose inner end bears upon the outer end of a push rod 21 which bears at its inner end against a boss 22 formed centrally of a diaphragm pressure plate 23. The position of the rod 21 relatively to the magnet 17 is thus made to indicate the position of the diaphragm plate 23 relatively to the diaphragm casing 24 and also the position of the annular valve 3 relatively to its seating.

The button 19 is pressed downwards by a spring 25 when the armature 18 is released from the pull of the magnet 17 but when the cooker is cold the button 19 stays in the inner position shown in Fig. 1 owing to the attraction of the magnet, the annular valve 3 being under such conditions off its seat to enable the full gas flow to pass.

To the inner side of the diaphragm casing 24 is connected one end of a capillary tube 35 which connects the chamber on the inner side of the diaphragm 7 with a phial 37 containing an inert gas, preferably nitrogen, and disposed within the oven under control. The dimensions of the phial are such that the capacity of the diaphragm chamber relatively to the said phial is small, so that inaccuracy of operation caused by change of temperature of the diaphragm chamber is small also.

As the temperature of the oven rises the increase of pressure in the diaphragm chamber forces the diaphragm 7 outwards, that is in a direction towards the knob 11, and the push rod 21 is thereby moved axially by the diaphragm plate 23 until the rod engages the stem 20 and forces it outwards moving the armature 18 away from the magnet 17 until the spring 25 is freed to operate and force the button 19 outwards, its movement being limited by a collar 26 formed on the button engaging against an inwardly turned flange 27 in the knob 11. The cylindrical walls of the button 19 are brightly coloured and its projection indicates at a glance that the oven has risen in temperature. The position of the annular valve 3 relatively to its seating at which the button 19 is projected is adjusted by rotating the screw threaded stem 20.

Leakage of gas along the sides of the push rod 21 is prevented by filling with a grease packing an annular space 36 formed within the spindle 10 around the said rod.

Rotation of the knob 11 is limited to one turn by means of a stop 28 formed on the casing part b which is engaged by a pin or lug 29 attached to the knob.

I claim:

1. A thermostatic temperature control valve comprising a diaphragm responsive to changes of fluid pressure caused by temperature variations, a gas inlet valve controlled by movements of said diaphragm, a push rod operated by said diaphragm, a rotary spindle for varying the pressure at which said valve is operated, an operating knob carried by said spindle, a coloured indicating device normally held retracted within said knob by magnetic attraction and a spring for ejecting said indicating device to a visible position when the magnetic attraction is broken by movement of the push rod due to the diaphragm reaching the position of maximum temperature.

2. A thermostatic temperature control device comprising an operating member responsive to changes of temperature, a control spring normally opposing movement of the operating member, a valve controlled by movement of the operating member, a movable indicating device capable of occupying at least two positions, a magnet for holding the indicating device in one position, means operated by the movement of the valve for moving the indicating device against the pull of the magnet, and means for moving the indicating device to a second position when the magnetic attraction is broken.

3. A thermostatic temperature control device as claimed in claim 2, wherein said operating member includes a diaphragm, and a push rod for transmitting the variations in position of said diaphragm to the said indicating device.

4. A thermostatic temperature control device as claimed in claim 2, wherein said operating member comprises a diaphragm and a push rod movable by said diaphragm, and including an adjusting spindle surrounding said push rod, manually operable means for adjusting said spindle, and means carried by the inner end of said spindle for varying the pressure of said control spring.

5. A thermostatic temperature control device as claimed in claim 2, including a hand adjusting device having a spring within it, and wherein said indicating device comprises a coloured cylindrical indicating element movable within limits axially of said adjusting device and carrying an armature at its inner end, and wherein said magnet is fixed within said adjusting device and normally attracts said armature, said spring within said adjusting device being operative to cause projection of the indicating element whenever said magnetic attraction is broken.

6. A thermostatic temperature control device according to claim 2, wherein said valve comprises an annular valve disc capable of being initially pre-set relatively to its seating, a spring urging the said valve disc onto its seating, and means operated by the said control spring adapted to lift the valve disc from its seating.

7. A thermostatic temperature control device comprising a casing, a diaphragm responsive to changes of temperature, an adjustable spring opposing movement of said diaphragm, a valve element adapted to be moved to open position by said spring, a hand adjusting device, a colored signal device mounted within said hand adjusting device, magnetic means normally holding said signal device inoperative, and means actuated by said diaphragm to break the attraction of said magnetic means and cause said signal device to be moved into a visible position.

8. A thermostatic temperature control device according to claim 7 including means for independently adjusting said valve element to vary its position relatively to its seating when said signal device becomes operative.

9. A thermostatic temperature control device comprising a diaphragm responsive to changes of temperature, a valve element controlled by said diaphragm, a colored signal device having magnetic means normally holding it retracted, and means actuated by said diaphragm when a predetermined temperature is reached for breaking the attraction of said magnetic means and ejecting the signal device to a visible position.

10. A thermostatic temperature control device comprising a casing, a diaphragm responsive to changes of temperature, a control spring opposing movement of said diaphragm, an adjusting spindle for varying the pressure of said spring, a disc valve element, means actuated by said spring to lift said valve element, a spring tending to close said valve element, a hand adjusting element on said spindle, a colored signal device having means for normally holding it by magnetic attraction within said adjusting element, and means operated by said diaphragm to break said magnetic attraction and eject the said signal device to a visible position.

11. A thermostatic temperature control device according to claim 10 wherein said casing is formed in two parts, the rear portion of said casing housing said diaphragm, valve element and control spring, and the front portion of said casing housing said adjusting spindle and having a gas inlet passage leading to the seating of said valve element.

JOHN EDWARD SHERLOCK.